(12) United States Patent
Watanabe (10) Patent No.: US 7,236,878 B2
(45) Date of Patent: Jun. 26, 2007

(54) METHOD AND APPARATUS FOR PERIPHERAL VEHICLE POSITION CALCULATION

(75) Inventor: Hisayuki Watanabe, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 502 days.

(21) Appl. No.: 10/929,607

(22) Filed: Aug. 30, 2004

(65) Prior Publication Data

US 2005/0065715 A1    Mar. 24, 2005

(30) Foreign Application Priority Data

Sep. 5, 2003    (JP) .............................. 2003-313911

(51) Int. Cl.
*G01C 21/00* (2006.01)
(52) U.S. Cl. .................. 701/200; 701/66; 701/207; 701/214; 340/988; 340/992; 340/993
(58) Field of Classification Search .................. 701/35, 701/66, 200, 207, 214; 340/438, 988, 992, 340/993; 280/6.151; 455/518
See application file for complete search history.

(56) References Cited

U.S. PATENT DOCUMENTS

| 5,983,161 A | * | 11/1999 | Lemelson et al. .......... 701/301 |
| 6,510,381 B2 | | 1/2003 | Grounds et al. |
| 6,611,755 B1 | * | 8/2003 | Coffee et al. ............... 701/213 |
| 6,892,131 B2 | * | 5/2005 | Coffee et al. ............... 701/200 |

* cited by examiner

*Primary Examiner*—Gertrude A. Jeanglaude
(74) *Attorney, Agent, or Firm*—Brinks Hofer Gilson & Lione (57) ABSTRACT

A signal processing unit of a radio communication section of a vehicle-mounted device mounted on a vehicle broadcasts first sets of data, each set of data including a vehicle speed and a traveling direction of the vehicle at a predetermined period when the vehicle changes the vehicle speed or the traveling direction. The signal processing unit broadcasts second sets of data including the current vehicle position, the vehicle speed, and the traveling direction of the vehicle at predetermined timing. When receiving the first data and the second data from a peripheral vehicle, the signal processing unit calculates a position of the peripheral vehicle in accordance with the first and second sets of data.

23 Claims, 8 Drawing Sheets

CURRENT VEHICLE INFORMATION

| VEHICLE IDENTIFIER |
|---|
| NETWORK ADDRESS (MAC ADDRESS) |
| POSITIONAL INFORMATION (LONGITUDE AND LATITUDE) |
| VEHICLE SPEED |
| VEHICLE TRAVELING DIRECTION |

FIG. 3

PERIPHERAL VEHICLE POSITIONAL INFORMATION

| VEHICLE IDENTIFIER | MAC ADDRESS | LONGITUDE AND LATITUDE | SPEED | DIRECTION | RECEPTION TIME |
|---|---|---|---|---|---|
| | | | | | |
| | | | | | |
| | | | | | |
| | | | | | |

| DATA ITEM | DEFINITION 1 | DEFINITION 2 |
|---|---|---|
| VEHICLE IDENTIFIER | 4 bytes | 4 bytes |
| NETWORK ID | 6 bytes | 6 bytes |
| POSITIONAL INFORMATION | — | 8 bytes |
| SPEED | 2 bytes | 2 bytes |
| DIRECTION | 2 bytes | 2 bytes |
| TOTAL | 14 bytes | 22 bytes |

FIG. 8B

| VEHICLE SPEED | COMMUNICATION INTERVAL | MOVING DISTANCE |
|---|---|---|
| 10 km/h | 0.1 sec | 0.277 m |
| 20 km/h | 0.1 sec | 0.555 m |
| 30 km/h | 0.1 sec | 0.833 m |
| 40 km/h | 0.1 sec | 1.111 m |
| 50 km/h | 0.1 sec | 1.388 m |
| 60 km/h | 0.1 sec | 1.666 m |
| 70 km/h | 0.1 sec | 1.944 m |

METHOD AND APPARATUS FOR PERIPHERAL VEHICLE POSITION CALCULATION

BACKGROUND OF THE INVENTION

1. Field of the Invention

The present invention relates to vehicle-mounted devices and peripheral vehicle position calculation methods, and more particularly, to a vehicle-mounted device and a peripheral vehicle position calculation method for calculating positions of peripheral vehicles on the basis of information received from the peripheral vehicles via inter-vehicle communication and for performing predetermined processing based on the positions of the peripheral vehicles.

2. Description of the Related Art

Development in communication technologies has enabled communication among moving objects, such as vehicles, (referred to as inter-vehicle communication). For example, Bluetooth™, radio local area networks (LANs), and other means are available as inter-vehicle communication means.

Bluetooth™ is a radio link technology intended to be used as a cable replacement between electronic devices of a moving body and a fixed apparatus or between electronic devices of a moving body and another moving body. Bluetooth™ performs data packet transmission by a time-division duplex (TDD) system of a slot length of 625 μs and employs a frequency-hopping technique in which the frequency changes for each packet. For communication via Bluetooth™, a master makes inquiries about the types of slaves existing near the master using IQ packets, and each of the slaves existing near the master answers with a Bluetooth device address and clock information necessary for connection establishment using a frequency hopping sequence (FHS) packet. In other words, by making the inquiries, device addresses and clock information of all the slaves that answer the inquiries can be collected. The Bluetooth device address is a unique address given to all the Bluetooth apparatuses. Then, the master performs "Page" processing using a Bluetooth device address and clock information of a selected predetermined slave so that connection between the master and the slave is actually established to transfer data.

In contrast, in an AdHoc network using a radio LAN (autonomous distributed network), each mobile station has a unique address (for example, an internet protocol version 6 (IPV6) address). In order to create a network, a source station regularly sends checking signal waves including its own address. Destination stations receive the checking signal waves, and send answer signals including their own addresses to the source station. The source station receives the answer signal waves, and identifies peripheral stations that can communicate with the source station. The identified stations are collected and stored. Accordingly, the network is created to perform communication.

A technology for accurately notifying a passenger of a source vehicle about a positional relationship between the source vehicle and peripheral vehicles by acquiring positions of the peripheral vehicles in real time via inter-vehicle communication using the inter-vehicle communication means described above is disclosed, for example, in Japanese Unexamined Patent Application Publication No. 11-195196.

However, in order to acquire positions of peripheral vehicles in real time with high accuracy via inter-vehicle communication using an AdHoc network, a Bluetooth network, or the like, each of the peripheral vehicles must broadcast the current position (longitude and latitude information), vehicle speed information, and traveling direction information at frequent intervals. Thus, a communication band is congested in proportion to an increase in the number of peripheral vehicles constituting the network. In other words, positional information cannot be communicated with high accuracy in a limited communication band. In order to communicate positional information with high accuracy, a wider band must be allocated for such inter-vehicle communication. However, this is not possible under the current communication scheme.

SUMMARY OF THE INVENTION

Accordingly, an object of the present invention is to reduce the amount of information used for inter-vehicle communication and to be capable of communicating positional information even in a limited communication band.

Another object of the present invention is the capability of monitoring positions of peripheral vehicles in real time and with high accuracy.

According to a first aspect of the present invention, a peripheral vehicle position calculation method in a vehicle-mounted device mounted on a vehicle is provided. The position of a peripheral vehicle near the vehicle is calculated in accordance with information included in a message received via inter-vehicle communication. A first set of data including a vehicle speed and a traveling direction of the vehicle is broadcast at a predetermined period via the inter-vehicle communication when the vehicle changes the vehicle speed or the traveling direction. A second set of data including a current vehicle position, the vehicle speed, and the traveling direction of the vehicle is broadcast at predetermined timing via the inter-vehicle communication. The position of the peripheral vehicle is calculated in accordance with both set of data when they are received from the peripheral vehicle.

When the amount of speed change is less than or equal to a predetermined amount of speed change and the amount of direction change is less than or equal to a predetermined amount of direction change, the first set of data is broadcast at a first period. When the amount of speed change exceeds the predetermined amount of speed change or when the amount of direction change exceeds the predetermined amount of direction change, the first set of data is broadcast at a second period, which is shorter than the first period. When the vehicle turns at an intersection or stops, the second set of data is broadcast. Because the position of the peripheral vehicle is initially unknown, a request to send the second data is sent to the peripheral vehicle, and the position of the peripheral vehicle is determined using positional information included in the second data distributed in response to the request. Then, the position of the peripheral vehicle is calculated in accordance with the method described above. The calculated position of the peripheral vehicle is distinguishably displayed on a navigation map display. Also, approach to the peripheral vehicle is determined and an appropriate warning is issued. Monitoring of a vehicle that does not send the first set of data or the second set of data over a predetermined time or more is terminated.

Also, approach of the peripheral vehicle to the vehicle is determined in accordance with the frequency of reception of the first data from the peripheral vehicle. Approach of the vehicle to a vehicle ahead is determined in accordance with the frequency of transmission of the first data from the vehicle and the frequency of transmission of the first data from the vehicle ahead, and an appropriate warning is issued.

According to a second aspect of the present invention, a vehicle-mounted device is provided. The device calculates a position of a peripheral vehicle near the vehicle in accordance with information included in a message received via inter-vehicle communication and performs predetermined processing. The vehicle-mounted device includes an inter-vehicle communication unit for performing communication among vehicles; a detection unit for detecting a vehicle speed and a traveling direction of the vehicle; a first broadcasting unit for broadcasting a first set of data including the vehicle speed and the traveling direction at a predetermined period via inter-vehicle communication when the vehicle changes the vehicle speed or the traveling direction; a second broadcasting unit for broadcasting a second set of data including the vehicle position, the vehicle speed, and the traveling direction of the vehicle at predetermined timing via the inter-vehicle communication; a calculation unit for calculating the position of the peripheral vehicle on the basis of the first and second sets of data when receiving the first and second sets of data from the peripheral vehicle; and a processing unit for performing the predetermined processing based on the position of the peripheral vehicle. More specifically, when the amount of speed change is less than or equal to a predetermined amount of speed change and the amount of direction change is less than or equal to a predetermined amount of direction change, the first broadcasting unit broadcasts the first set of data at a first period. When the amount of speed change exceeds the predetermined amount of speed change or when the amount of direction change exceeds the predetermined amount of direction change, the first broadcasting unit broadcasts the first set of data at a second period, which is a shorter period than the first period. When the vehicle turns at an intersection or stops, the second broadcasting unit broadcasts the second set of data.

According to the present invention, it is not necessary to regularly send positional information (longitude and latitude data), and it is sufficient to send the positional information when necessary. Thus, the amount of transmission data for the positional information can be reduced, and the amount of information for communication among vehicles is thus reduced. Consequently, positional information can be communicated even in a limited communication band.

Also, according to the present invention, a position of a peripheral vehicle is calculated on the basis of the vehicle speed and the traveling direction regularly sent, and positional information is appropriately received to correct the calculated position. Thus, the position of the peripheral vehicle can be monitored in real time and with high accuracy.

Also, according to the present invention, the position of the peripheral vehicle is accurately displayed on a map. Furthermore, approach of a current vehicle to the peripheral vehicle or approach of the peripheral vehicle to the current vehicle can be accurately identified, and an appropriate warning can be issued.

DESCRIPTION OF THE PREFERRED EMBODIMENTS

A vehicle-mounted device mounted on a vehicle and including inter-vehicle communication means broadcasts a first set of data including a vehicle speed and a traveling direction of the vehicle at a predetermined period via inter-vehicle communication when the vehicle changes the speed or the traveling direction and broadcasts a second set of data including a current vehicle position (longitude and latitude data), a vehicle speed, and a traveling direction of the vehicle at predetermined timing via the inter-vehicle communication. For example, when the amount of speed change is less than or equal to a predetermined amount of speed change and the amount of direction change is less than or equal to a predetermined amount of direction change, the first set of data is broadcast at a first period. When the amount of speed change exceeds the predetermined amount of speed change or when the amount of direction change exceeds the predetermined amount of direction change, the first set of data is broadcast at a second period, which is a shorter period than the first period. When the vehicle turns at an intersection or stops, the second set of data is broadcast. When the first and second set of data are received from a peripheral vehicle, a position of the peripheral vehicle is calculated at the predetermined periods in accordance with the first and second sets of data, and the position of the peripheral vehicle is distinguishably displayed on a navigation map display. Also, approach of the peripheral vehicle or approach to a vehicle ahead is determined and an appropriate warning is issued.

Figure 1:
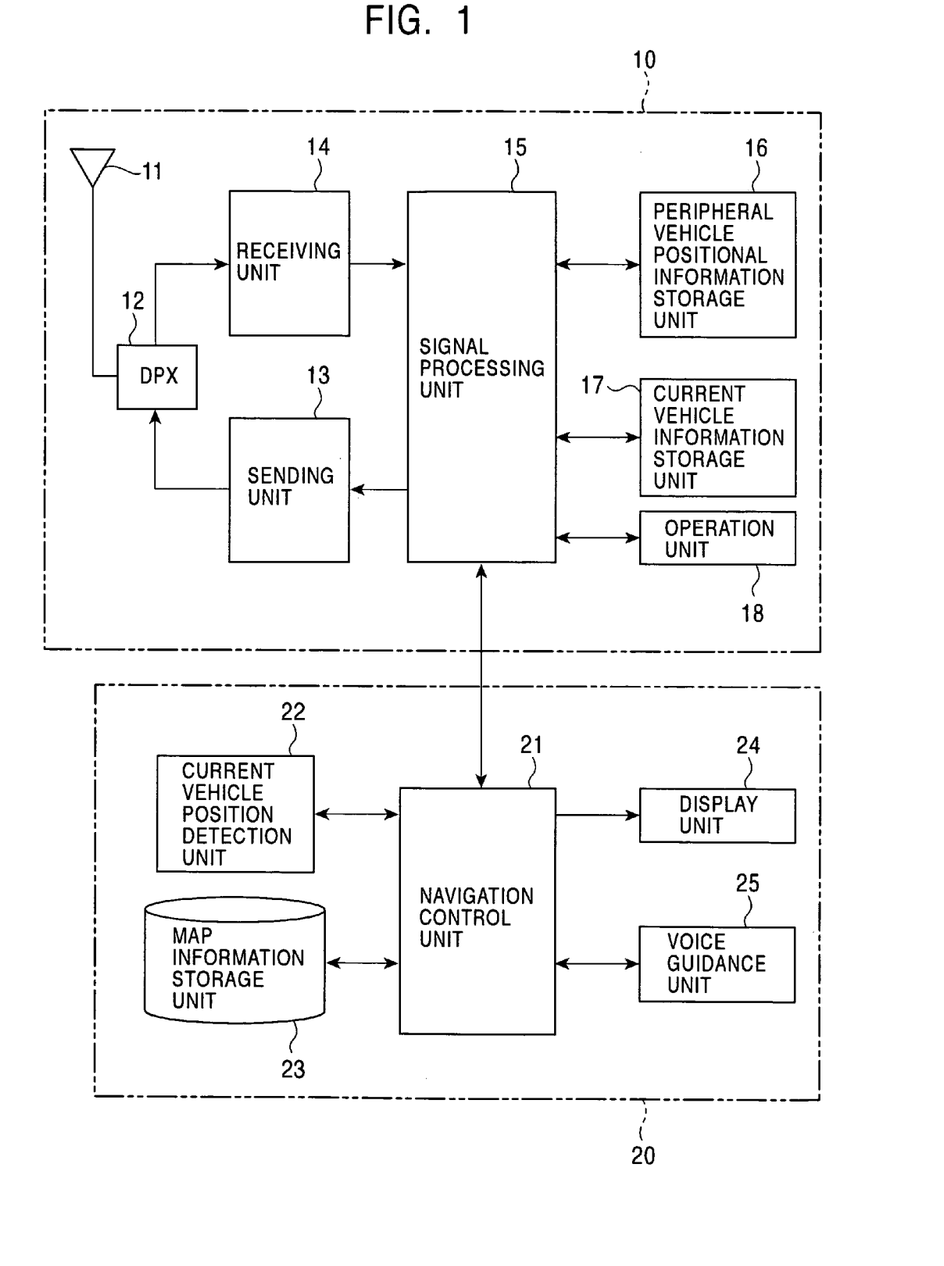
FIG. 1 shows the structure of a vehicle-mounted device including inter-vehicle communication means according to an embodiment of the present invention.
Figure 2:
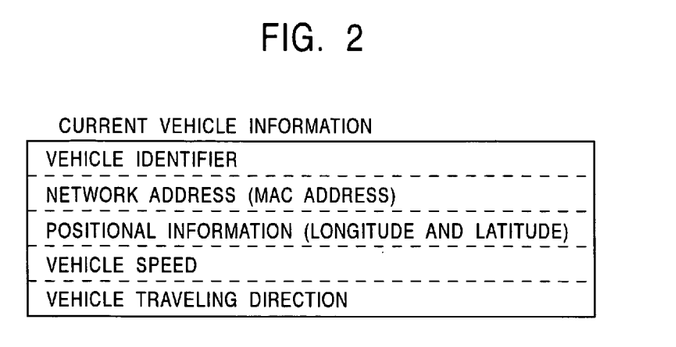
FIG. 2 explains a memory content of a current vehicle information storage unit.
Figure 3:
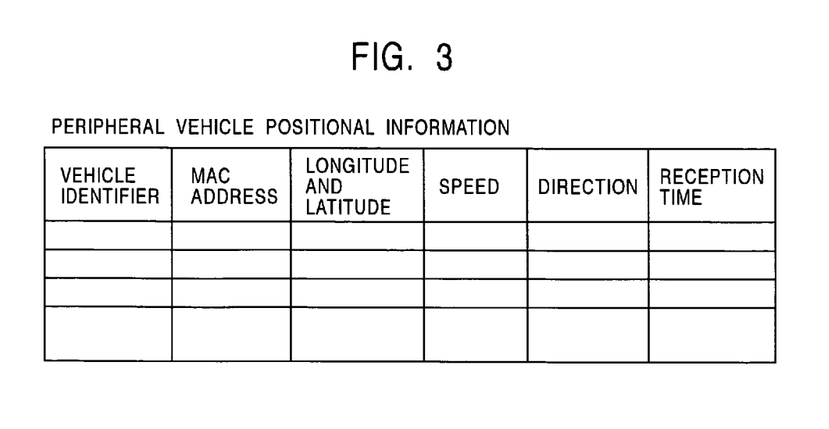
FIG. 3 explains a memory content of a peripheral vehicle positional information storage unit.

Structure of Vehicle-Mounted Device According to an Embodiment of the Present Invention:

FIG. 1 shows the structure of a vehicle-mounted device mounted on a current vehicle and including inter-vehicle communication means. The vehicle-mounted device includes a radio communication section 10 and a navigation section 20. The radio communication section 10 includes an antenna 11; a duplexer 12; a sending unit 13 and a receiving unit 14 for sending and receiving information to and from vehicle-mounted devices of peripheral vehicles; a signal processing unit 15 provided with a radio LAN interface function for communicating with the vehicle-mounted devices of the peripheral vehicles and performing various types of control processing; a peripheral vehicle positional information storage unit 16 for storing positional information and the like of the peripheral vehicles; a current vehicle information storage unit 17 for storing information on the current vehicle; an operation unit 18; and the like. The signal processing unit 15 controls sending and receiving of travel information (traveling speed and traveling direction), positional information (longitude and latitude), and the like to and from the peripheral vehicles constituting a network. The signal processing unit 15 also manages the positions of the peripheral vehicles, performs various types of display based on the positions of the peripheral vehicles, and sends appropriate warnings. As shown in FIG. 2, the current vehicle information storage unit 17 stores current vehicle information, such as a vehicle identifier, a network address (media access control (MAC) address), positional information (longitude and latitude), a vehicle speed, and a vehicle traveling direction. As shown in FIG. 3, the peripheral vehicle positional information unit 16 stores peripheral vehicle positional information, such as a vehicle identifier, a MAC address, positional information (longitude and latitude), a vehicle speed, a vehicle traveling direction, and information reception time, on the basis of information sent from each of the peripheral vehicles constituting the network.

The navigation section 20 includes a navigation control unit 21; a current vehicle position detection unit 22 including a global positioning system (GPS) for detecting a vehicle position and self sensors, such as a vehicle speed sensor and a vehicle direction sensor; a map information storage unit 23 for storing map information; a display unit 24 for displaying a map and positions of peripheral vehicles; and a voice guidance unit 25 for providing a warning. The navigation control unit 21 controls navigation, and reports information on a vehicle position, a vehicle speed, and a vehicle traveling direction acquired from the current vehicle position detection unit 22 to the signal processing unit 15 of the radio communication section 10 in accordance with a request from the radio communication section 10. The signal processing unit 15 stores the information on the vehicle position, the vehicle speed, and the vehicle traveling direction in the current vehicle information storage unit 17.

Frame Structure and First and Second Definition Data

Figures 4, 5:
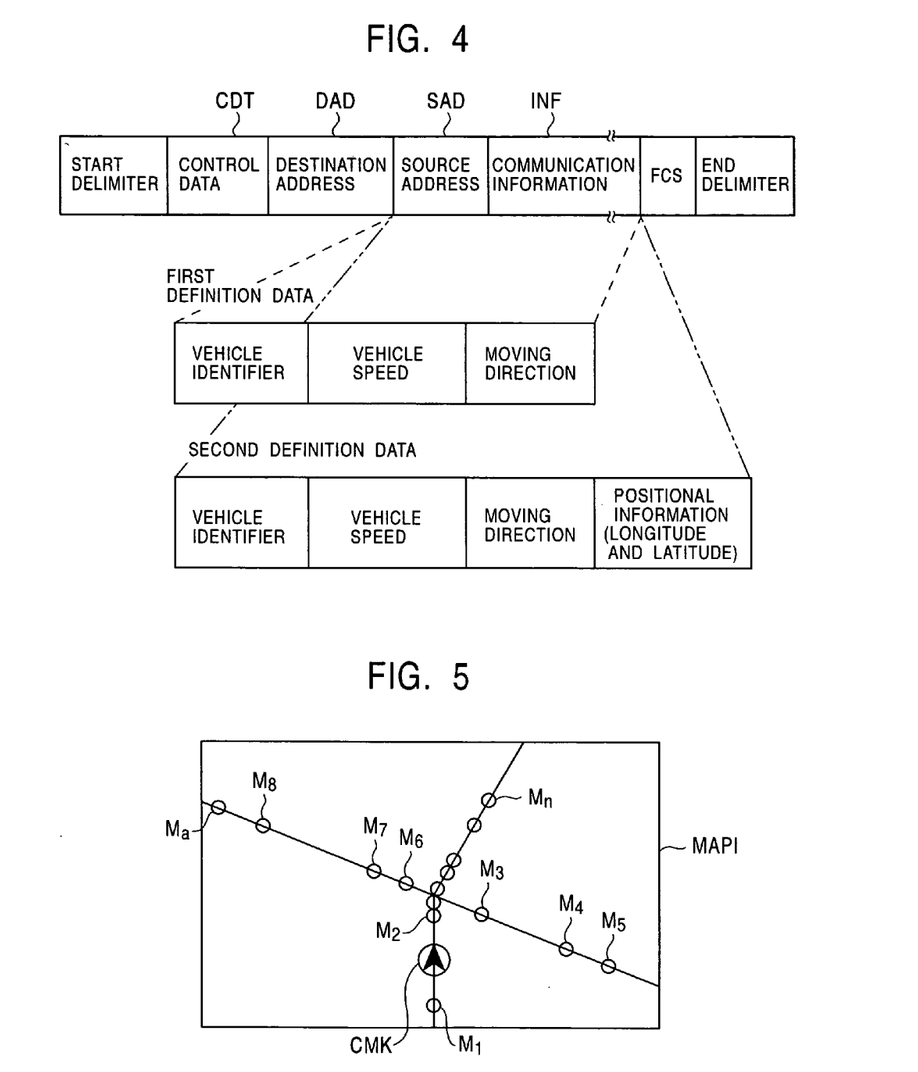
FIG. 4 shows the structure of a frame used in a LAN.
FIG. 5 shows an example in which a current vehicle position mark CMK and peripheral vehicles position marks Ml to Mn representing positions of peripheral vehicles are displayed on a map image.

FIG. 4 shows the structure of a frame used in a radio LAN. In the frame, control data CDT, a destination address (media access control (MAC) address) DAD, a source address SAD, communication information INF, error check data (frame check sequence) FCS, and the like are arranged between a start delimiter and an end delimiter. Information to be communicated is included in the communication information INF. As information relating to embodiments of the present invention, first definition data and second definition data are provided.

When a vehicle changes the speed or the traveling direction, the first definition data is broadcast at a predetermined period via inter-vehicle communication. As shown in FIG. 4, the first definition data includes a vehicle identifier, a vehicle speed, and a moving direction. In actual practice, if the amount of speed change is less than or equal to a predetermined amount of speed change (for example, 5 km/h) and the amount of average direction change is less than or equal to a predetermined amount of direction change, the first definition data is broadcast at a first period (for example, with two-second intervals). If the amount of speed change exceeds the predetermined amount of speed change or if the amount of average direction change exceeds the predetermined amount of direction change, the first definition data is broadcast at a second period (for example, with 100-millisecond intervals), which is more frequent than the first period. The second definition data is broadcast at predetermined timing via inter-vehicle communication. As shown in FIG. 4, the second definition data includes a vehicle identifier, a vehicle speed, a moving direction, and positional information (longitude and latitude). When the vehicle turns at an intersection or stops, the second definition data is broadcast.

If a destination address is not included at a header of a frame, the first and second definition data including a destination address is sent.

Display Example

FIG. 5 shows an application according to an embodiment of the present invention and shows an example in which a current vehicle position mark CMK and peripheral vehicles position marks M1 to Mn representing positions of peripheral vehicles are displayed on a map image MAPI. Such applications for example, warn against approaching vehicles and the like.

Broadcast Processing

Figure 6:
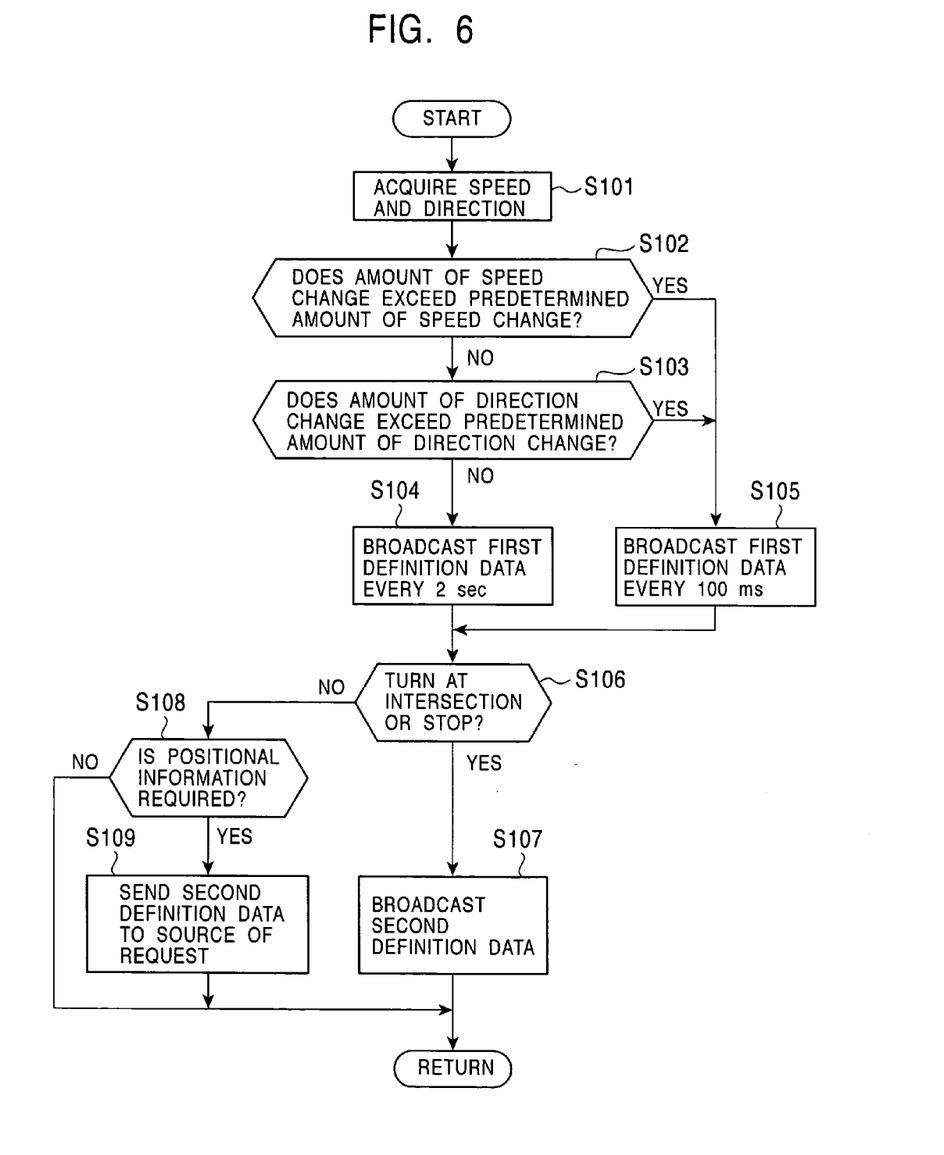
FIG. 6 is a flowchart showing broadcast control processing in the vehicle-mounted device.

FIG. 6 is a flowchart showing broadcast control processing in the vehicle-mounted device.

The signal processing unit 15 acquires the speed and the direction of the current vehicle from the navigation unit 20 (act S101). The signal processing unit 15 determines whether the amount of speed change exceeds a predetermined amount of speed change (for example, ±5 km/h) (act S102) and determines whether the amount of average direction change exceeds a predetermined amount of direction change (for example, ±3°) (act S103). If the amount of speed change is less than or equal to the predetermined amount of speed change and the amount of average direction change is less than or equal to the predetermined amount of direction change, the signal processing unit 15 broadcasts the first definition data with two-second intervals (act S104). In contrast, if the amount of speed change exceeds the predetermined amount of speed change or if the amount of average direction change exceeds the predetermined amount of direction change, the signal processing unit 15 broadcasts the first definition data with 100-millisecond intervals (act S105). In other words, for stable traveling with a small speed change and a small direction change, the first definition data is broadcast with relatively long intervals, and for traveling with a large speed change or a large direction change, the first definition data is broadcast with short intervals. As a result of this, a vehicle-mounted device that receives the first definition data maintains accuracy of positions of peripheral vehicles by calculating the positions of the peripheral vehicles using the first definition data with two-second intervals for stable traveling with a small speed change and a small direction change and by calculating the positions of the peripheral vehicles using the first definition data received with 100-millisecond intervals for traveling with a large speed change or a large direction change.

After the processing in acts S104 and S105, the signal processing unit 15 acquires determination of whether the current vehicle turns at an intersection or stops from the navigation section 20 (act S106). If the current vehicle turns at an intersection or stops, the signal processing unit 15 broadcasts the second definition data (act S107). Because the second definition data includes positional information (longitude and latitude), a vehicle that receives the second definition data from a peripheral vehicle corrects a position of the peripheral vehicle in accordance with the positional information, and then, calculates and updates the position of the peripheral vehicle with predetermined time intervals in accordance with a received vehicle speed and direction. Accordingly, positional information can be broadcast at predetermined timing to correct a position. Thus, the position can be managed with high accuracy.

In contrast, if it is determined that the current vehicle does not turn at an intersection or stops in act S106, the signal processing unit 15 determines whether a request for positional information is sent from a peripheral vehicle (act S108). If a request for positional information is sent from a peripheral vehicle, the signal processing unit 15 sends the second definition data to a source of the request (act S109). Accordingly, the current position can be reported to a peripheral vehicle in response to a request.

Although the first definition data is broadcast with 100-millisecond intervals if the amount of speed change exceeds a predetermined amount of speed change or if the amount of direction change exceeds a predetermined amount of direction change, the first definition data may be sent with 100-millisecond intervals when the amount of speed change is a predetermined maximum amount of speed change and the first definition data may be sent with longer time intervals in accordance with a decrease in the traveling speed.

Vehicle Position Calculation and Management Processing

Figure 7:
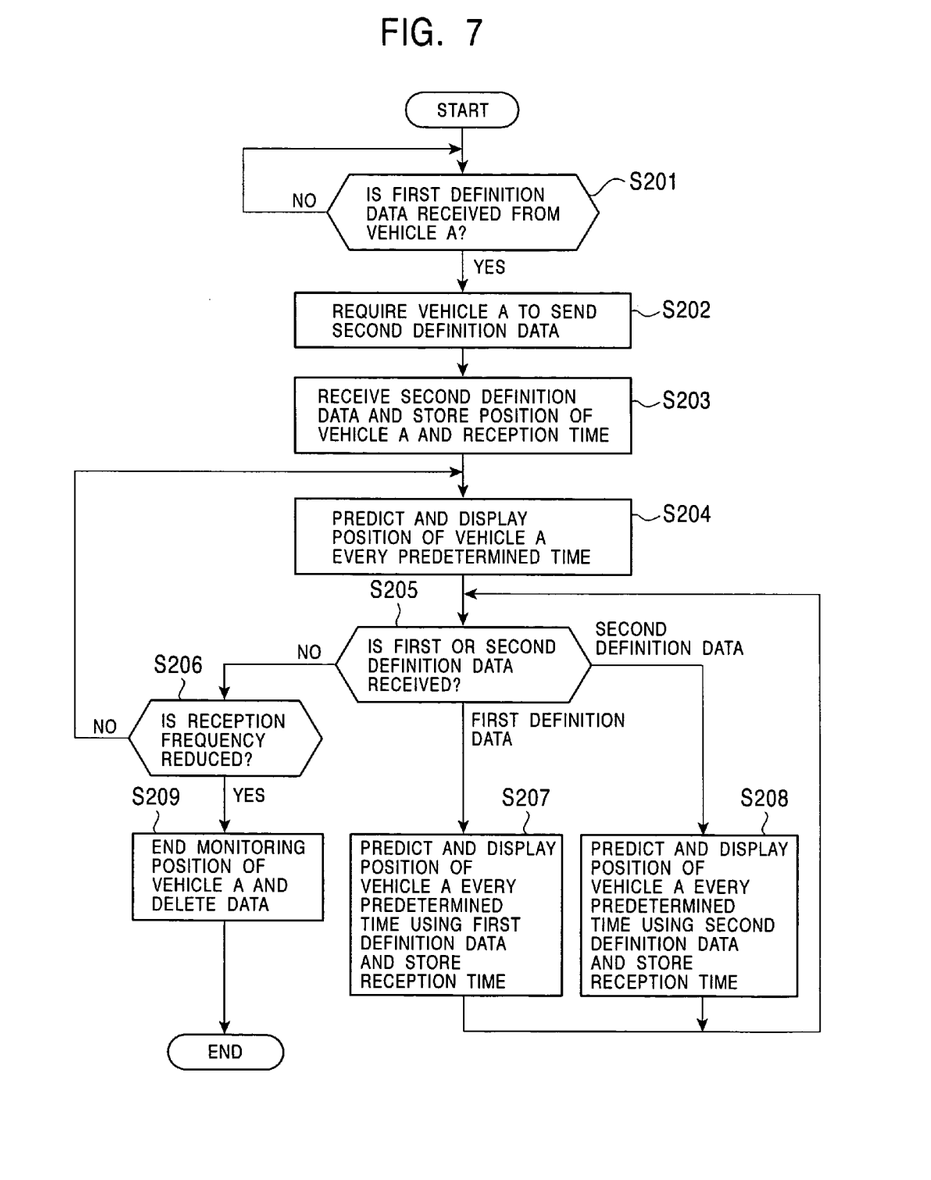
FIG. 7 is a flowchart of a process for receiving first and second definition data and calculating and managing a position of a peripheral vehicle.

FIG. 7 is a flowchart of a process performed by the signal processing unit 15 of a vehicle that receives the first and second definition data and calculates and manages the position of a peripheral vehicle. Managing the position of a vehicle A from entering a network and exiting the network is described below.

The signal processing unit 15 monitors whether the first definition data is received from the vehicle A (act S201). If the first definition data is received, the signal processing unit 15 requires the vehicle A to send the second definition data (act S202). If the second definition data is received from the vehicle A, the signal processing unit 15 stores the position, speed, and traveling direction of the vehicle A and reception time in the peripheral vehicle positional information storage unit 16 (act S203). Then, the signal processing unit 15 calculates (predicts) the position of the vehicle A with predetermined time intervals on the basis of the speed and traveling direction of the vehicle A and updates the positional information in the peripheral vehicle positional information storage unit 16. Also, positional data of the vehicle A is input to the navigation control unit 21, and the peripheral vehicle position mark Ma is displayed on the map image MAPI, as shown in FIG. 5 (act S204).

Then, the signal processing unit 15 monitors whether the first or second definition data is received (act S205). If neither of the first or second definition data is received, the signal processing unit 15 determines whether the elapsed time from the last reception time exceeds a predetermined time, in other words, whether the reception frequency is reduced (act S206). If the reception frequency is not reduced, the process returns to act S204. Then, the signal processing unit 15 predicts, updates, and displays the position of the vehicle A on the basis of the information stored in the peripheral vehicle positional information storage unit 16.

In contrast, if the first definition data is received in act S205, the signal processing unit 15 calculates (predicts) and updates the position of the vehicle A with predetermined time intervals using new data on the vehicle speed and direction included in the first definition data and stores reception time. Also, the peripheral vehicle position mark Ma is displayed on the map image MAPI (act S207).

In contrast, if the second definition data is received in act S205, the signal processing unit 15 corrects positional information of the vehicle A in accordance with positional information (longitude and latitude) included in the second definition data, and stores reception time in the peripheral vehicle positional information storage unit 16. Then, the signal processing unit 15 calculates (predicts) the position of the vehicle A with predetermined time intervals on the basis of the speed and traveling direction of the vehicle A included in the second definition data and updates the positional information in the peripheral vehicle positional information unit 16. Also, as shown in FIG. 5, the peripheral vehicle position mark Ma is displayed on the map image MAPI (act S208).

After the processing in acts S207 and S208, the process returns to act S205 to monitor whether the first or second definition data is received. If neither of the first or second definition data is received, the signal processing unit 15 determines whether the elapsed time from the last reception time exceeds the predetermined time; in other words, whether or not the reception frequency is reduced (act S206). If the reception frequency is not reduced, the process returns to act S204. Then, the signal processing unit 15 predicts, updates, and displays the position of the vehicle A on the basis of the latest information stored in the peripheral vehicle positional information storage unit 16.

Then, the processing in acts S204 to S208 is continued. If the vehicle A moves to an area in which communication cannot be performed and the reception frequency is thus reduced, the determination in act S206 is affirmative. Thus, the signal processing unit 15 stops monitoring the position of the vehicle A and deletes data on the position of the vehicle A (act S209). Accordingly, the signal processing unit 15 terminates processing for monitoring the position of the vehicle A.

As described above, the first definition data not including positional information (longitude and latitude data) is regularly sent and the second definition data including positional information (longitude and latitude data) is sent at predetermined timing as necessary. Thus, the amount of transmission data for positional information can be reduced, and the amount of information for inter-vehicle communication is thus reduced. Consequently, positional information can be communicated even in a limited communication band.

Effect of Reduction in Amount of Transmission Data

Figure 8A:
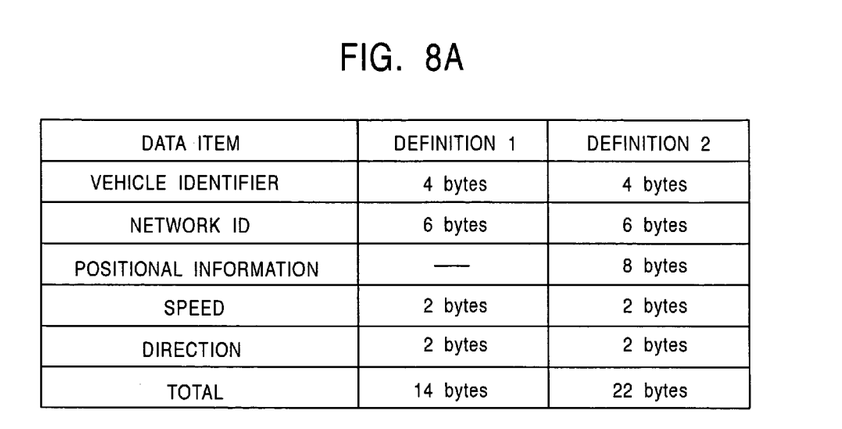
FIGS. 8A and 8B explain the effect of a reduction in the amount of transmission data in an embodiment of the present invention.
Figure 8B:
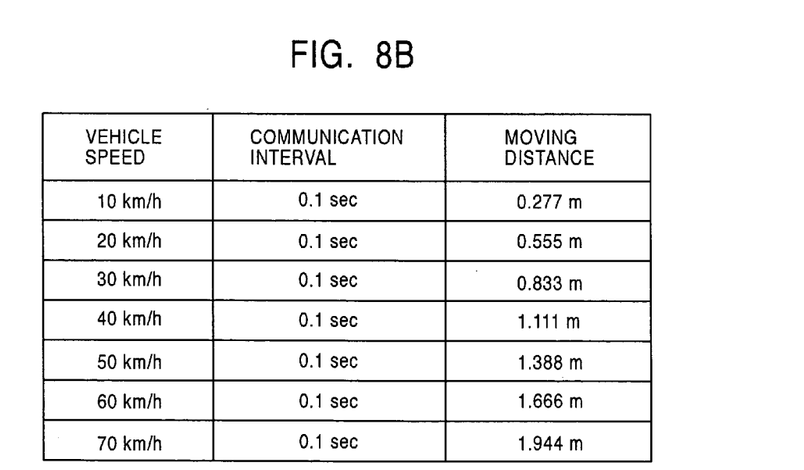

FIGS. 8A and 8B explain the effect of a reduction in the amount of transmission data in the present invention. FIG. 8A explains the size of each piece of information constituting the first definition data (definition 1) and the second definition data (definition 2). A MAC address of a transmission source is included in each of the definition data. FIG. 8B shows the relationship between the vehicle speed (km/h) and a moving distance where a communication time interval is 0.1 seconds (=100 milliseconds).

The amount of transmission data is compared between a comparative example and a working example when positional information exchange services are realized among 300 peripheral vehicles under the condition that a position error is less than or equal to 2 m from the actual position. Only the second definition data is sent in the comparative example. Also, when the vehicle speed is 70 km/h, a communication time interval for a position error of 2 m or less is 0.1 seconds (=100 milliseconds). Thus, communication is performed with this time interval in the comparative example.

Comparative Example

When the second definition data is broadcast with 0.1-second intervals, the data transmission speed is 528 kilobits per second (kbps). In other words, 22 bytes×8 bits×10 times/sec=1,760 bps/vehicle 1,760 bps×300 vehicles=528,000 bps=528 kbps Working Example For comparing with the comparative example, data is sent every 0.1 seconds. The second definition data is sent once for every five times, and the first definition data is sent four times for every five times.

14 bytes×8 bits×8 times/sec=896 bps/vehicle 22 bytes×8 bits×2 times/sec=352 bps/vehicle (896+352) bps×300 vehicles=374,000 bps=374 kbps As described above, the total amount of transmission data can be significantly reduced.

Adjusting a transmission interval in accordance with the vehicle speed can further reduce congestion in a communication band. For example, referring to FIG. 8B, when the vehicle speed is 20 km/h, it is sufficient for data to be sent with 0.3-second intervals for maintaining a position error of 2 m or less. Also, when the vehicle speed is 30 km/h, it is sufficient for data to be sent with 0.2-second intervals.

Usage Example of Peripheral Vehicle Positional Information

Although an example in which positions of peripheral vehicles are superimposed on a map image has been explained, the degree of approach of a vehicle traveling behind and the degree of approach to a vehicle traveling ahead can be calculated. If a vehicle is approaching from behind, a warning, such as "a vehicle is approaching from behind" may be issued. If the current vehicle is approaching a vehicle traveling ahead, a warning, such as "approaching a vehicle traveling ahead" may be issued.

Also, by monitoring the frequency of reception of the second definition data from a vehicle traveling ahead or a vehicle traveling behind and determining the approach, an appropriate warning can be issued.

Figure 9:
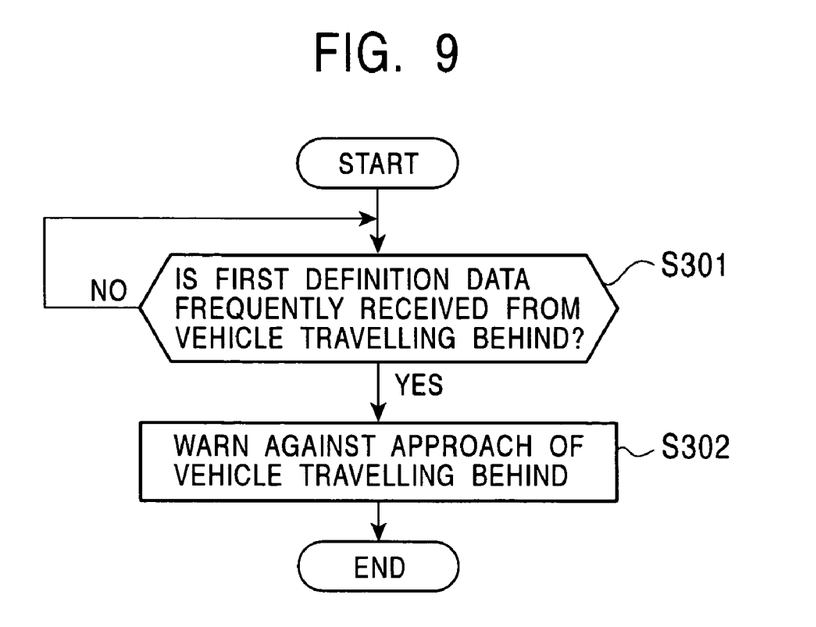
FIG. 9 is a flowchart showing a process for warning against approach of a vehicle traveling behind.

FIG. 9 is a flowchart showing a process for warning that a vehicle traveling behind the current vehicle is approaching the current vehicle. The signal processing unit 15 determines whether to receive the first definition data frequently from a vehicle traveling immediately behind the current vehicle (act S301). If the signal processing unit 15 receives the first definition data frequently, the signal processing unit 15 warns against the approach of the vehicle traveling behind (act S302). In this case, a warning to reduce the speed can be issued to the vehicle traveling behind via inter-vehicle communication. If the signal processing unit 15 checks if the traveling speed of the vehicle traveling behind increases in act S301, the determination that the vehicle traveling behind is approaching can be made accurately.

Figure 10:
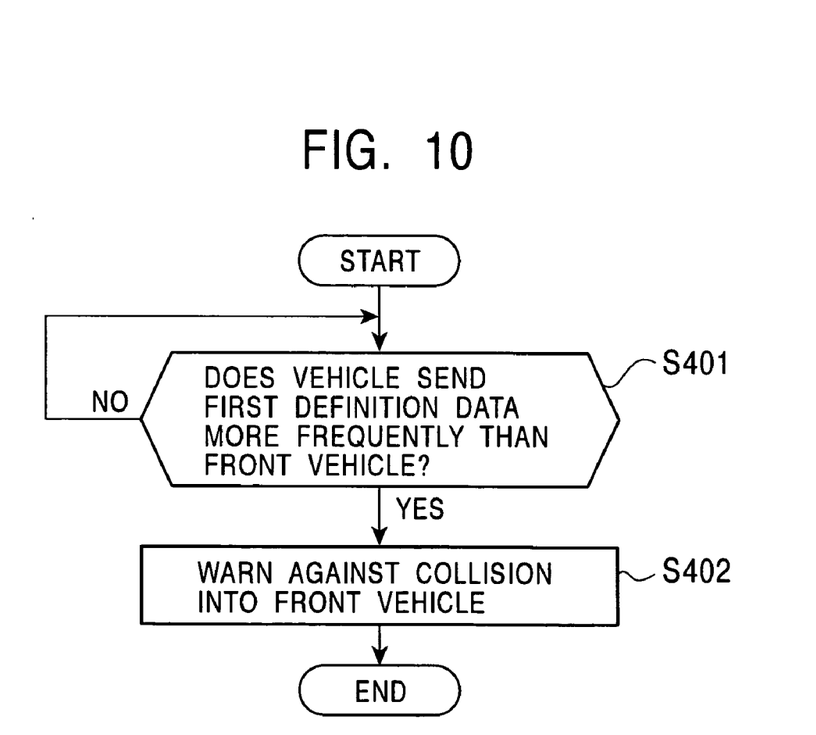
FIG. 10 is a flowchart showing a process for warning against approach to a vehicle ahead.

FIG. 10 is a flowchart showing a process for warning that the current vehicle is approaching a vehicle ahead. The signal processing unit 15 determines whether to send the first definition data more frequently than a vehicle traveling immediately ahead (act S401). If the determination in act S401 is affirmative, the signal processing unit 15 warns against the approach to the vehicle ahead and a danger of a collision (act S402).

Figure 11:
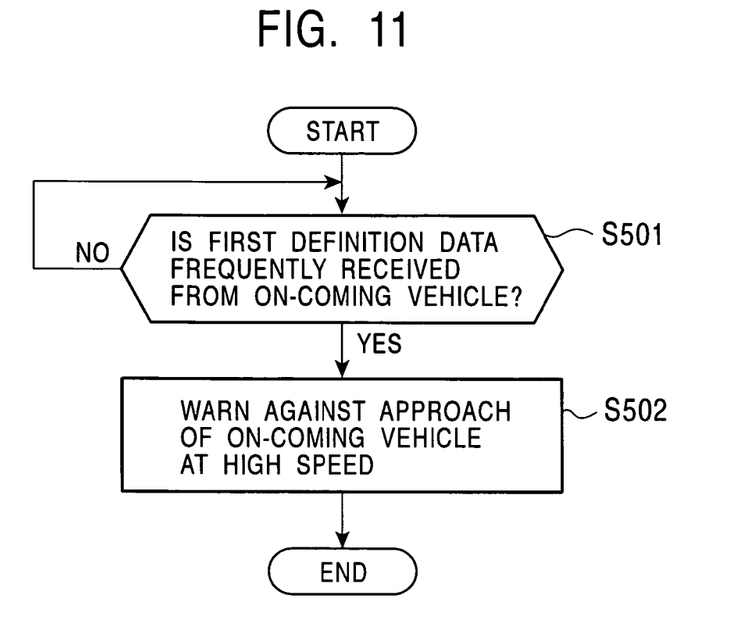
FIG. 11 is a flowchart showing a process for warning against approach of a vehicle coming from ahead.

FIG. 11 is a flowchart showing a process for warning that a vehicle is approaching from ahead. The signal processing unit 15 determines whether the first definition data is frequently received from an on-coming vehicle coming from the opposite direction (act S501). If the first definition data is frequently received from the on-coming vehicle, the signal processing unit 15 warns against the vehicle in the opposite lane approaching at high speed (act S502).

Figure 12:
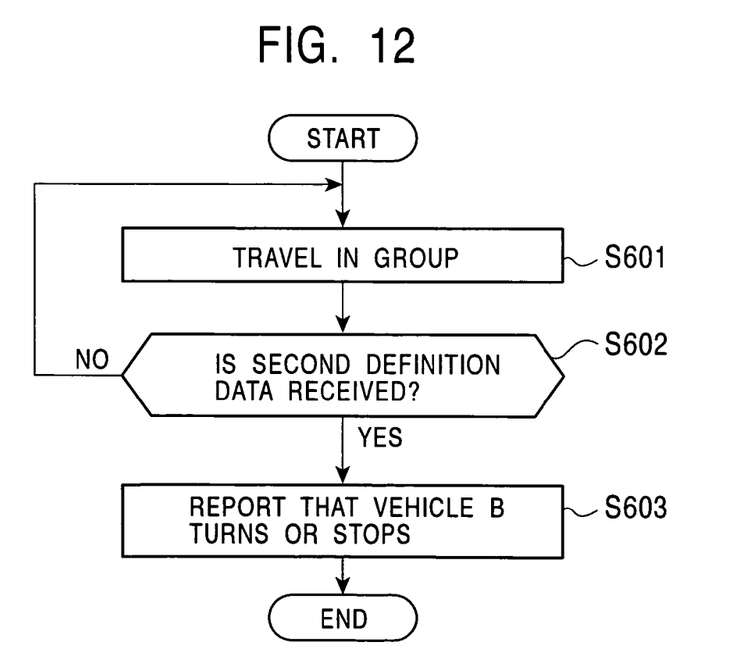
FIG. 12 is a flowchart showing a process for identifying and reporting that a peripheral vehicle turns at an intersection or stops in accordance with reception of the second definition data.

FIG. 12 is a flowchart showing a process for identifying and reporting that a peripheral vehicle turns at an intersection or stops in accordance with reception of the second definition data. A plurality of vehicles including a vehicle B travels in a group (act S601). The signal processing unit 15 determines whether the second definition data is received (act S602). If the second definition data is received from the vehicle B, the signal processing unit 15 reports and warns that the vehicle B turns at an intersection or stops (act S603).

Modifications

Although a direction sensor has not been mentioned above, a detector using X-by-Wire provided on a steering unit for electrically detecting a steering angle may be used as a direction sensor.

Also, although positional information has been explained as information acquired by a position detection unit, positional information acquired by map matching processing may be used.

Also, a peripheral position mark on a map image may be displayed such that the type of a vehicle, such as a truck, a van, a sedan, or a bus, is distinguishable or such that the actual color of the peripheral vehicle is distinguishable.

In this case, such information must be included in information used for inter-vehicle communication.

It is to be understood that a wide range of changes and modifications to the embodiments described above will be apparent to those skilled in the art and are contemplated. It is therefore intended that the foregoing detailed description be regarded as illustrative, rather than limiting, and that it be understood that it is the following claims, including all equivalents, that are intended to define the spirit and scope of the invention.

What is claimed is:

1. A peripheral vehicle position calculation method, comprising the acts of:

provideing in a vehicle-mounted device operable to calculate a position of a peripheral vehicle near the vehicle in accordance with information included in a message received via inter-vehicle communication;

broadcasting a first set of data including a vehicle speed and a traveling direction of the vehicle at a predetermined period via the inter-vehicle communication when the vehicle changes the vehicle speed or the traveling direction;

broadcasting a second set of data including a current vehicle position, the vehicle speed, and the traveling direction of the vehicle at predetermined timing via the inter-vehicle communication; and calculating the position of the peripheral vehicle in accordance with the first and second set of data when receiving the first data and the second data from the peripheral vehicle.

2. The peripheral vehicle position calculation method of claim 1, wherein:

the act of broadcasting a first set of data occurs at a first period when the vehicle changes speed at an amount less than or equal to a predetermined amount of speed change; and the act of broadcasting a second set of data occurs at a second period having a shorter length of time than the first period when the vehicle changes speed at an amount greater than the predetermined amount of speed change.

3. The peripheral vehicle position calculation method of claim 2, wherein the second period is increased in length in accordance with a reduction in the vehicle speed.

4. The peripheral vehicle position calculation method of claim 2, wherein movement of the peripheral vehicle toward the vehicle is determined by evaluating a frequency of reception of a plurality of first sets of data from the peripheral vehicle.

5. The peripheral vehicle position calculation method of claim 2, wherein movement of the vehicle toward a vehicle ahead is determined by evaluating a frequency of transmission of a plurality of first sets of data from the vehicle and the frequency of transmission of a plurality of first sets of data from the vehicle ahead.

6. The peripheral vehicle position calculation method of claim 1, wherein:
the act of broadcasting a first set of data occurs at a first period when the vehicle changes direction at an amount less than or equal to a predetermined amount of direction change; and
the act of broadcasting a second set of data occurs at a second period having a shorter length of time than the first period when the vehicle changes direction at an amount greater than the predetermined amount of direction change.

7. The peripheral vehicle position calculation method of claim 6, wherein movement of the peripheral vehicle toward the vehicle is determined by evaluating a frequency of reception of a plurality of first sets of data from the peripheral vehicle.

8. The peripheral vehicle position calculation method of claim 6, wherein movement of the vehicle toward a vehicle ahead is determined by evaluating a frequency of transmission of a plurality of first sets of data from the vehicle and a frequency of transmission of a plurality of first sets of data from the vehicle ahead.

9. The peripheral vehicle position calculation method of claim 1, further comprising the act of storing reception times when the first set of data and the second set of data are received from the peripheral vehicle.

10. The peripheral vehicle position calculation method of claim 1, further comprising the act of broadcasting the second set of data when said vehicle turns at an intersection or stops.

11. The peripheral vehicle position calculation method of claim 1, wherein a request for the second set of data is sent to the peripheral vehicle; and
the position of the peripheral vehicle is acquired using positional information included in the second set of data distributed in response to the request.

12. The peripheral vehicle position calculation method of claim 1, further comprising the act of terminating the monitoring of a position of a non-transmission vehicle that fails to send the first set of data or the second set of data within a predetermined time.

13. The peripheral vehicle position calculation method of claim 1, further comprising the act of distinguishably displaying the calculated position of the peripheral vehicle on a navigation map display.

14. A vehicle-mounted device for calculating a position of a peripheral vehicle near the vehicle, the vehicle-mounted device comprising:
a sending/receiving unit operable to send or receive information to and from a vehicle-mounted device of a peripheral vehicle;
a vehicle position detection unit operable to acquire information on a vehicle position, a vehicle speed, and a traveling direction; and
a signal processing unit operable to generate a first set of data at a predetermined period from the information acquired from the vehicle position detection unit when said vehicle changes the vehicle speed or the traveling direction, the first set of data including the vehicle speed and the traveling direction of the vehicle, operable to generate a second set of data at a predetermined period, the second set of data including the vehicle position, the vehicle speed and the traveling direction of said vehicle, and operable to calculate the position of the peripheral vehicle from first and second sets of data for the vehicle and first and second sets of data from the peripheral vehicle;
wherein the sending/receiving unit is operable to send the first set and second sets of data for the vehicle and to receive the first and second sets of data from a peripheral vehicle.

15. The vehicle-mounted device of claim 14, wherein:
the signal processing unit broadcasts the first set of data at a first period when an amount of speed change is less than or equal to a predetermined amount of speed change and the amount of direction change is less than or equal to a predetermined amount of direction change; and
the signal processing unit broadcasts the first data at a second period, the second period having a shorter length than the first period when the amount of speed change exceeds the predetermined amount of speed change or when the amount of direction change exceeds the predetermined amount of direction change.

16. The vehicle-mounted device of claim 15, wherein the signal processing unit increases the length of the second period in accordance with a reduction in the vehicle speed.

17. The vehicle-mounted device of claim 15, wherein:
the signal processing unit determines that the peripheral vehicle is approaching the vehicle by calculating the frequency of reception of first sets of data from the peripheral vehicle; and
the signal processing unit warns against approach of the peripheral vehicle when the peripheral vehicle is approaching said vehicle.

18. The vehicle-mounted device of claim 15, wherein:
the signal processing unit determines whether the vehicle is approaching a vehicle ahead by calculating the frequency of transmission of the first sets of data from the vehicle and the frequency of transmission of the first sets of data from the vehicle ahead; and
the signal processing unit warns against approach to the vehicle ahead when said vehicle is approaching the vehicle ahead.

19. The vehicle-mounted device of claim 14, wherein the signal processing unit stores reception times when the first sets of data and the second sets of data are received from the peripheral vehicle.

20. The vehicle-mounted device of claim 14, wherein the signal processing unit broadcasts a second set of data when said vehicle turns at an intersection or stops.

21. The vehicle-mounted device of claim 14, wherein:
the signal processing unit sends a request for the second data to the peripheral vehicle; and the signal processing unit acquires the position of the peripheral vehicle using positional information included in a second set of data received in response to the request.

22. The vehicle-mounted device of claim 14, wherein:

the signal processing unit terminates monitoring of a position of a non-transmission vehicle that fails to send a first set of data or a second set of data with a predetermined time.

23. The vehicle-mounted device of claim 14, wherein the signal processing unit distinguishably displays the calculated position of the peripheral vehicle on a navigation map display.

* * * * *